(12) United States Patent
Bhandari et al.

(10) Patent No.: US 8,059,686 B2
(45) Date of Patent: *Nov. 15, 2011

(54) METHOD, APPARATUS AND SYSTEM FOR GUARANTEED PACKET DELIVERY TIMES IN ASYNCHRONOUS NETWORKS

(75) Inventors: Rajan Bhandari, Newbury (GB); Miguel Dajer, Succasunna, NJ (US); Mahendra Tallor, Harrow (GB)

(73) Assignee: Alcatel Lucent, Paris (FR)

( * ) Notice: Subject to any disclaimer, the term of this patent is extended or adjusted under 35 U.S.C. 154(b) by 60 days.

This patent is subject to a terminal disclaimer.

(21) Appl. No.: 12/277,956

(22) Filed: Nov. 25, 2008

(65) Prior Publication Data

US 2009/0073986 A1   Mar. 19, 2009

Related U.S. Application Data

(63) Continuation of application No. 10/797,922, filed on Mar. 10, 2004, now Pat. No. 7,483,449.

(51) Int. Cl.
*H04J 3/06* (2006.01)
(52) U.S. Cl. ...................................... 370/503
(58) Field of Classification Search .................. None
See application file for complete search history.

(56) References Cited

U.S. PATENT DOCUMENTS

| | | | |
|---|---|---|---|
| 5,016,159 A | 5/1991 | Maruyama | |
| 5,245,609 A | 9/1993 | Ofek et al. | |
| 5,418,779 A | 5/1995 | Yemini et al. | |
| 5,761,431 A | 6/1998 | Gross et al. | |
| 6,246,702 B1 | 6/2001 | Fellman et al. | |
| 6,735,199 B1* | 5/2004 | Ofek ............................. | 370/389 |
| 6,973,090 B2* | 12/2005 | Ofek et al. .................... | 370/400 |
| 2001/0038628 A1 | 11/2001 | Ofek et al. | |
| 2002/0018475 A1 | 2/2002 | Ofek et al. | |
| 2005/0197680 A1* | 9/2005 | DelMain et al. ............... | 607/60 |

FOREIGN PATENT DOCUMENTS

| | | |
|---|---|---|
| JP | 2002135278 A | 5/2002 |
| WO | WO 01/10087 A | 2/2001 |
| WO | WO 01/35587 A1 | 5/2001 |
| WO | WO 03/069843 A | 8/2003 |
| WO | WO 03/107609 A | 12/2003 |

OTHER PUBLICATIONS

European Search Corresponding EP 05 25 1011, May 18, 2005, Lucent Technologies Inc.
Japanese Examiner's first office action dated Apr. 20, 2010, 7 pages.
Japanese Examiner's second office action dated Aug. 31, 2010, 4 pages.

(Continued)

*Primary Examiner* — Jianye Wu
(74) *Attorney, Agent, or Firm* — Wall & Tong, LLP

(57) ABSTRACT

A method and apparatus for guaranteeing packet delivery times in an asynchronous network includes generating a global timing schedule to synchronize the communication between the terminals of a network and, in response to at least one trigger, transmitting and receiving data according to the generated global timing schedule. To optimize bandwidth utilization, more than one terminal may transmit data during a specific time slot of each time frame of the global timing schedule as long as no more than one terminal attempts to transmit data to a common other terminal.

20 Claims, 7 Drawing Sheets

OTHER PUBLICATIONS

Office Action mailed Apr. 15, 2011 in Korean Patent Application No. Oct. 2005-0017986, Alcatel-Lucent USA Inc., Applicant, 1 page.
Examiner's Refusal Decision, dated Jan. 26, 2011, 1 page.

"Method, apparatus and System for Guaranteed Packet Delivery Times in Asynchronous Networks," Patent Application No. 2005-066774, 8 pages.

* cited by examiner

METHOD, APPARATUS AND SYSTEM FOR GUARANTEED PACKET DELIVERY TIMES IN ASYNCHRONOUS NETWORKS

CROSS-REFERENCE TO RELATED APPLICATIONS

This application is a continuation of U.S. patent application Ser. No. 10/797,922, filed Mar. 10, 2004 now U.S. Pat. No. 7,483,449, entitled METHOD, APPARATUS AND SYSTEM FOR GUARANTEED PACKET DELIVERY TIMES IN ASYNCHRONOUS NETWORKS, which application is incorporated herein by reference.

FIELD OF THE INVENTION

This invention relates to the field of data communication and, more specifically, to providing guaranteed delivery times for data packets communicated between communication devices in asynchronous networks.

BACKGROUND OF THE INVENTION

With the introduction of multimedia processing in computing systems and increased deployment of digital audio and video formats, there is an increased demand for reliable transmission of synchronous and isochronous data over standard, typically asynchronous, computer networks implementing Internet Protocols. While audio and video are examples of synchronous and isochronous data, substantially any data stream that must be clocked and is continuous would be considered synchronous and a data stream which must be delivered with determinant latency could be considered isochronous.

Typically, packet networks, such as local area networks implementing IP such as Ethernet, were developed to carry computer-type data. The computer-type data carried by such local area networks was primarily asynchronous in nature, and not highly sensitive to non-deterministic latencies. More specifically, the asynchronous data communication of such networks is a type of data communication that guarantees the delivery of the data and not the time of delivery of the data. In such networks, the delivery of the data is continuously retried until the receipt of the data is verified. The Ethernet protocol of such networks uses a carrier sense multiple access with collision detection media access control protocol (CSMA/CD MAC). This type of MAC is characterized by very low typical latencies, and reasonably high potential throughput.

In such packet networks, data communication between terminals is typically facilitated by Ethernet switches. Such switches typically maintain internal queues (i.e., a first-in-first-out (FIFO) memory queue) used to schedule the transferring of data from one terminal of the local area network to another. The data is buffered in the queue awaiting its turn for transmission. Such an architecture, however, does not allow for synchronous or isochronous transmission which requires determinant latency. As such, such packet networks have been recently modified for the transmission of synchronous and isochronous transfer of data. For example, in various modified asynchronous packet networks, a priority list for an included data queue has been implemented. However, such prioritized data queues, although maybe guaranteeing a time for transmission, do not also guarantee a time for reception by an intended receiver.

Another shortcoming of such modified Ethernet packet networks used for the transmission of synchronous and isochronous data lies in the potentially high latencies when collisions occur between terminals transmitting on the network. In response, various schemes have been developed for the transmission of synchronous and isochronous data over such packet network Ethernet protocol systems to avoid collisions. For example, a reservation system typically employs two communications channels; one channel, the reservation channel, is used to communicate reservation requests from individual stations to a central authority which then allocates bandwidth in the primary channel, as requested, if possible. The reservation channel typically carries asynchronous data, while the primary channel carries isochronous data. Such two channel systems, however, experience significant inefficiencies in transmission and also do not guarantee a time of reception.

Another such scheme for transmitting synchronous and isochronous data in typically asynchronous IP networks is disclosed in U.S. Pat. No. 5,761,431, issued Jun. 2, 1998 to Gross et al. In the Gross et al. Patent, an order persistent timer is provided in each terminal on a network to control the timing of the transmission of each isochronous data packet from a terminal, and to also control the timing of transmission of asynchronous data packets that include reservation requests. The OP timer at each terminal monitors traffic on the network from other stations to detect whether the network is active or idle. In an idle state (no packet on the network from another station), the OP timer times a number of deferral time intervals that are used with a network interrupt handler at the terminal to control the transmission of synchronous and isochronous data packets without collision, and asynchronous data packets thereafter. However, the inclusion of OP timers in each terminal in order for each terminal to be able to transmit synchronous and isochronous data packets without collision, as disclosed by Gross et al., results in significant inefficiencies in transmission at least because each terminal must detect an idle interval before transmitting queued synchronous or isochronous data. In addition, such a system does not guarantee a time of reception of transmitted synchronous or isochronous data.

SUMMARY OF THE INVENTION

The present invention solves the deficiencies of the prior art by providing a method, apparatus and system for providing guaranteed delivery times for data packet communication in a typically asynchronous network.

In one embodiment of the present invention, a method for guaranteeing delivery times of data communicated between the terminals of an asynchronous network includes generating a global timing schedule to synchronize the communication between the terminals of the network and, in response to at least one trigger, transmitting and receiving data according to the generated global timing schedule. A global timing schedule according to one embodiment of the present invention includes a recurring time frame including a plurality of time slots. Each of the time slots of each of the time frames is operative for the transmission of data from and the receiving of data by at least one terminal. The transmission of data by the terminals in accordance with the generated global timing schedule is prioritized such that a total latency for a synchronous data packet does not exceed a maximum allowable latency for the data.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method, apparatus and system for guaranteeing delivery times of synchronous and isochronous data in typically asynchronous packet networks. Although various embodiments of the present invention are described herein with respect to the delivery of synchronous data packets in local area networks, the specific embodiments of the present invention should not be treated as limiting the scope of the invention. It will be appreciated by those skilled in the art informed by the teachings of the present invention that the concepts of the present invention may be advantageously applied to substantially any packet network wherein it is desirable to guarantee the delivery time of any data, synchronous, isochronous or asynchronous.

Figure 1:
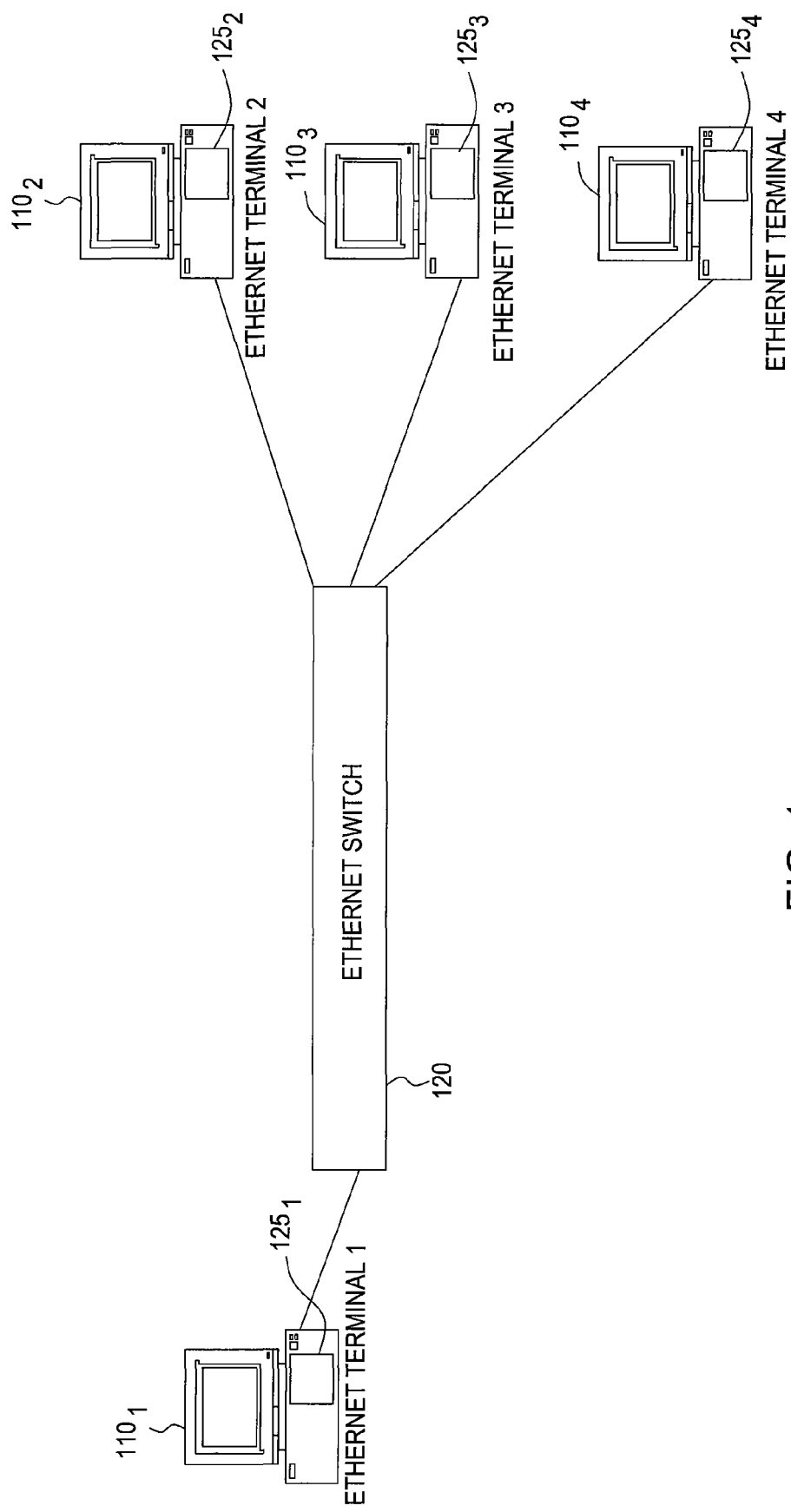
FIG. 1 depicts a high level block diagram of a conventional asynchronous local area network implementing Internet Protocol.

FIG. 1 depicts a high level block diagram of a conventional asynchronous local area network (LAN) implementing Internet Protocol (IP). The LAN 100 of FIG. 1 comprises four terminals (illustratively Ethernet terminals) $110_1$-$110_4$ and a switch (illustratively an Ethernet switch) 120. In addition, the four Ethernet terminals $110_1$-$110_4$ each comprise a network interface controller $125_1$-$125_4$. In the LAN 100 of FIG. 1, the Ethernet terminals $110_1$-$110_4$ may attempt to send data at the same time. The simultaneous data transmission in the LAN 100 may result in what is called data collision. To avoid such collision, the Ethernet LAN based on Carrier Sense Multiple Access/Collision Detection (CSMA/CD) technique is able to make the machines/devices stop transmitting data if the LAN network 100 is busy and wait for a while and try to transmit the same data again. More specifically, the Ethernet switch 120 buffers data from a source Ethernet terminal until a destination Ethernet terminal becomes free to receive the data intended for it. As such, an Ethernet LAN, such as the Ethernet LAN 100 of FIG. 1, is therefore more adopted in network applications in which a plurality of devices are in communication with each other. However, such Ethernet LANs, such as the Ethernet LAN 100 of FIG. 1, are not capable of providing transmission of synchronous or isochronous data.

More specifically, in a conventional asynchronous LAN implementing IP, such as the Ethernet LAN 100 of FIG. 1, received synchronous or isochronous data would also be maintained in a queue until such time that an intended receiving terminal is available. As such, the delivery time of the synchronous or isochronous data is not able to be guaranteed in such a LAN and the delivery of such data may fail.

To solve the deficiencies of the prior art, the inventors disclose herein the use of IP for guaranteed packet delivery times on a LAN. The method of the present invention provides a means of delivering a data packet, for example an Ethernet data packet, to a recognized terminal, for example an Ethernet terminal, with a known delay time without undermining conventional Ethernet protocol standards. In the present invention, the communication between terminals of a network is synchronized during the transmission of synchronous and isochronous data by time-multiplexing the data into a recurring frame structure. The term synchronous data, as used throughout this disclosure, should be considered to represent both synchronous and isochronous data to be transmitted and received in accordance with the present invention.

Figure 2:
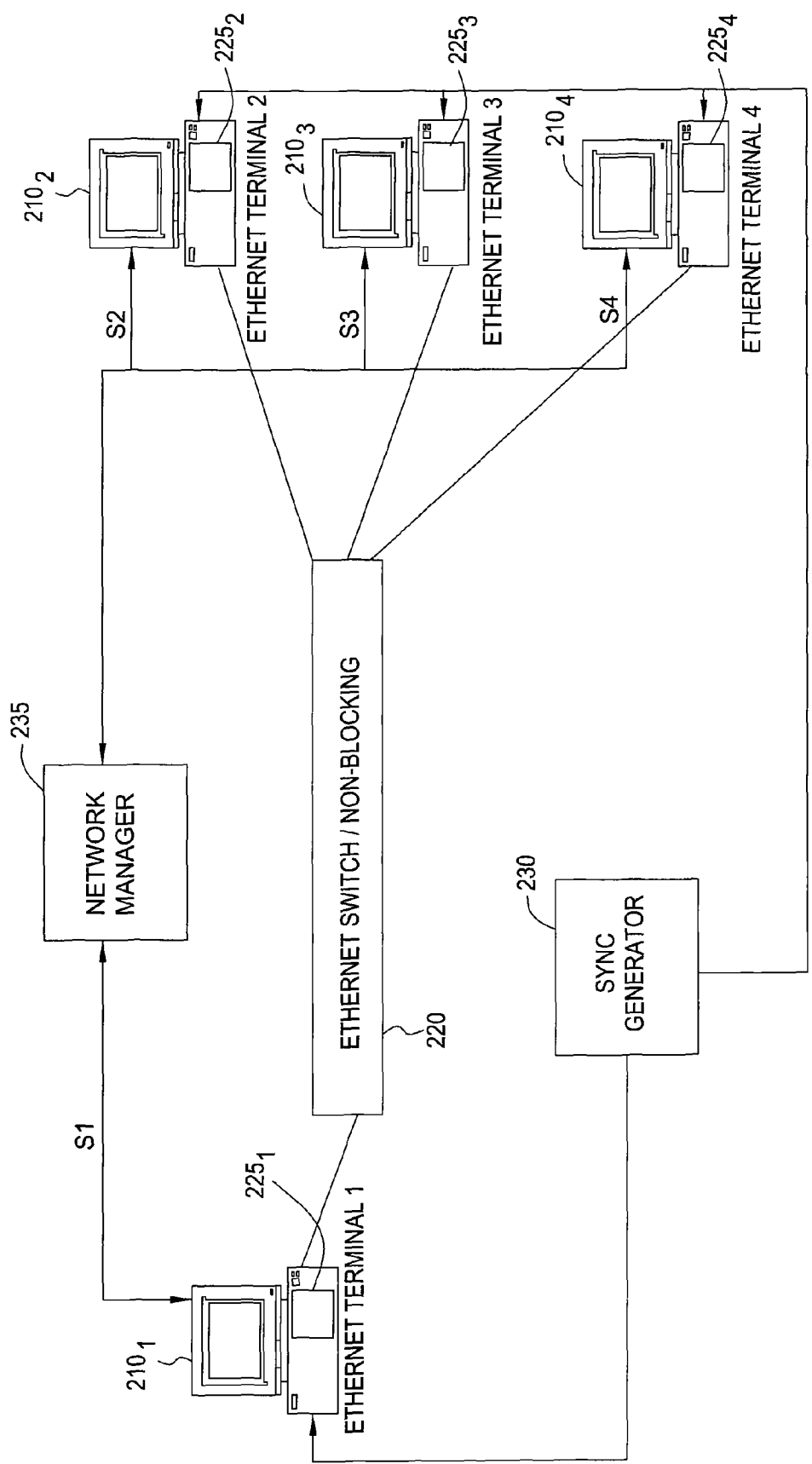
FIG. 2 depicts a high level block diagram of an embodiment of an asynchronous/synchronous LAN implementing Ethernet IP in accordance with the present invention.

FIG. 2 depicts a high level block diagram of an embodiment of an asynchronous/synchronous LAN implementing Ethernet IP in accordance with the present invention. The asynchronous/synchronous LAN 200 of FIG. 2 illustratively comprises four terminals (illustratively Ethernet terminals) $210_1$-$210_4$, a non-blocking switch (illustratively an Ethernet switch) 220, a Sync Generator 230 and a Network Manager 235. Each of the Ethernet terminals $210_1$-$210_4$ further comprises a network interface controller $225_1$-$225_4$. Non-blocking switches are known in the art and are essentially switches that have enough paths across it that a received data packet does not have to be buffered before being switched to an intended receiver. For package base networks with package headers as a routing mechanism, such a switch is considered as performing cut-through routing. Such non-blocking switches use package headers in the incoming data for source and destination address connectivity. The latency in such a system is defined by the position of the source and the destination address in the header. The interconnection of data between the Ethernet terminals $210_1$-$210_4$ of the asynchronous/synchronous LAN 200 of FIG. 2 is accomplished through the non-blocking switch 220, which is not described in detail herein.

The Network Manager 235 of FIG. 2 is implemented to communicate information between the various Ethernet terminals of the asynchronous/synchronous LAN 200 of FIG. 2 to assist in synchronizing the communication between the Ethernet terminals $210_1$-$210_4$. For example, the Network Manager 235 is operative to informing each of the Ethernet terminals $210_1$-$210_4$ of the various parameters of a global timing schedule defined by a Sync Time Frame and respective time slots within the Sync Time Frame in which respective ones of the Ethernet terminals $210_1$-$210_4$ have priority to communicate with another Ethernet terminal (described in detail below). The Network Manager 235 is also operative for defining various network and terminal parameters such as the priority of communication and other communication parameters (described in detail below) and informing each of the Ethernet terminals of such parameters.

Figure 3:
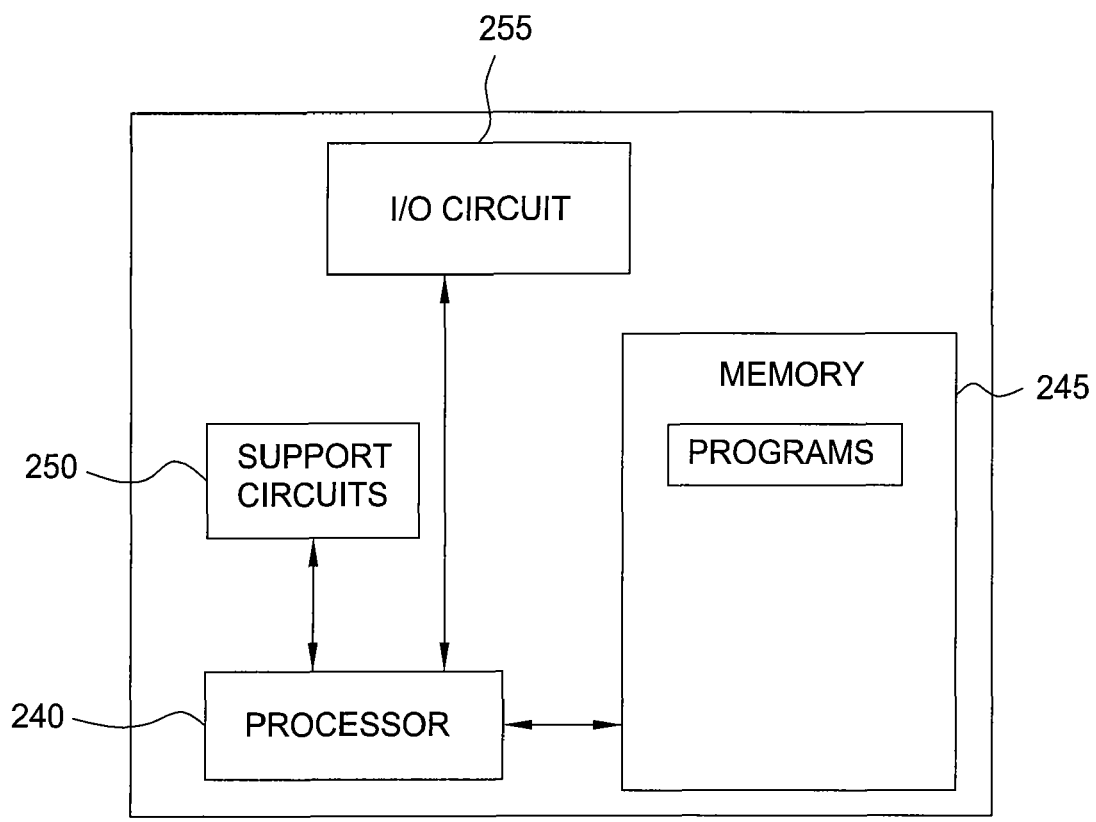
FIG. 3 depicts a high level block diagram of an embodiment of a Network Manager suitable for use in the asynchronous/synchronous LAN of FIG. 2.

FIG. 3 depicts a high level block diagram of an embodiment of a Network Manager suitable for use in the asynchronous/synchronous LAN 200 of FIG. 2. The Network Manager 235 of FIG. 3 comprises a processor 240 as well as a memory 245 for storing, for example, information, algorithms and control programs. The processor 240 cooperates with conventional support circuitry 250 such as power supplies, clock circuits, cache memory and the like as well as circuits that assist in executing the software routines stored in the memory 245. As such, it is contemplated that some of the process steps discussed herein as software processes may be implemented within hardware, for example, as circuitry that cooperates with the processor 240 to perform various steps. The Network Manager 235 also contains input-output circuitry 255 that forms an interface between the various functional elements communicating with the Network Manager 235. For example, in the embodiment of FIG. 2, the Network Manager 235 communicates with the Ethernet terminals $210_1$-$210_4$ via signal paths S1-S4, respectively.

Although the Network Manager 235 of FIG. 3 is depicted as a general purpose computer that is programmed to perform various control functions in accordance with the present invention, the processes of the Network Manager 235 may be implemented in hardware, for example, as an application specified integrated circuit (ASIC). As such, the process steps described herein are intended to be broadly interpreted as being equivalently performed by software, hardware, or a combination thereof.

Figure 4:
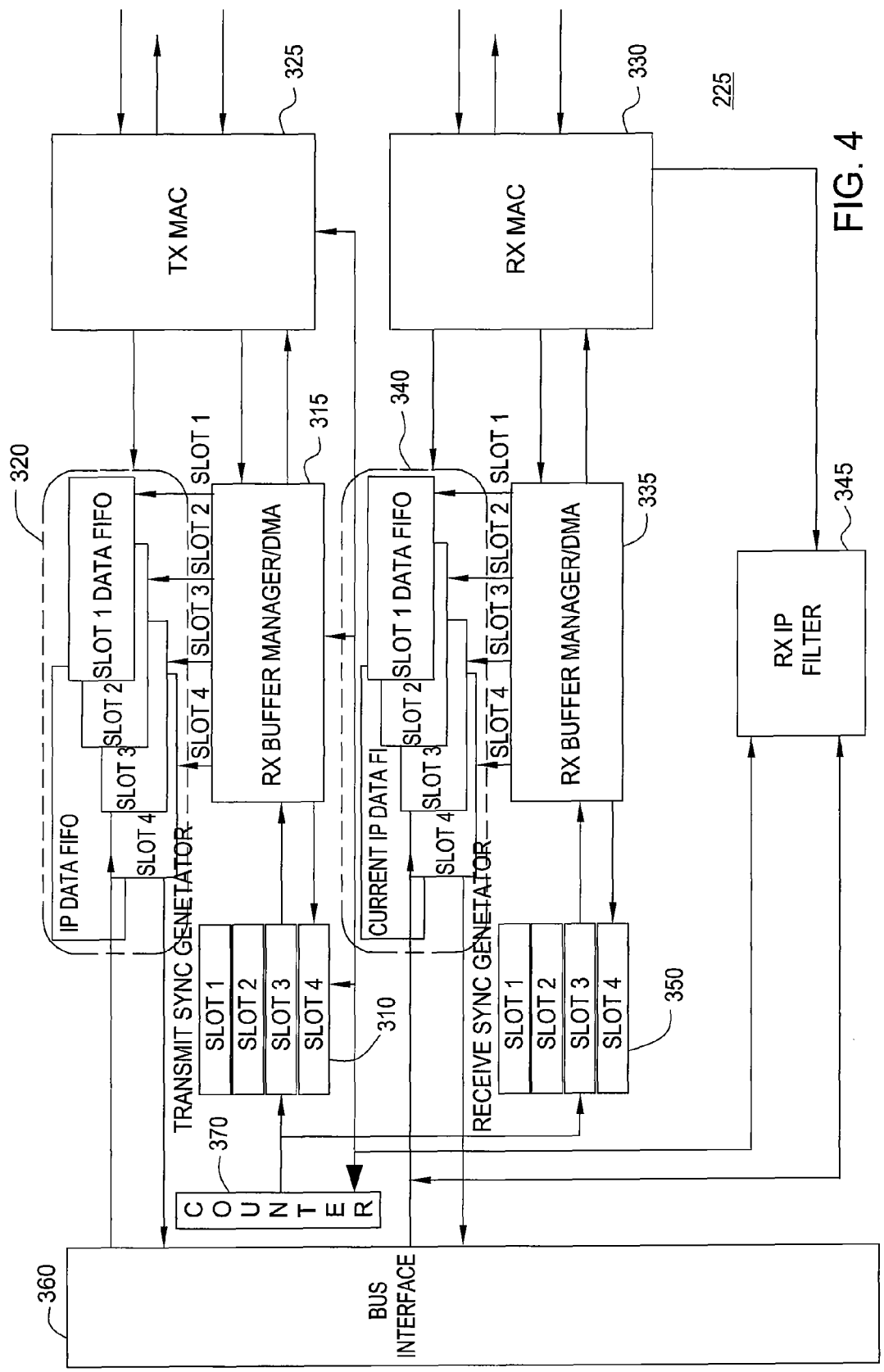
FIG. 4 depicts a high level block diagram of an embodiment of a network interface controller suitable for use in each of the Ethernet terminals of the asynchronous/synchronous LAN of FIG. 2.

FIG. 4 depicts a high level block diagram of an embodiment of a network interface controller 225 suitable for use in each of the Ethernet terminals $210_1$-$210_4$ of the asynchronous/synchronous LAN 200 of FIG. 2. Because each of the interface controllers $225_1$-$225_4$ of the Ethernet terminals $210_1$-$210_4$ is substantially the same, the network interface controller 225 of FIG. 4 should be considered representative of each of the interface controllers $225_1$-$225_4$ of the LAN 200 of FIG. 2. The network interface controller 225 of FIG. 4 is comprised of a Transmit portion and a Receive portion. The Transmit portion of the network interface controller 225 of FIG. 4 illustratively comprises a Transmit Sync Generator 310, a Transmit Buffer Manager/DMA 315, a Transmit data queue (illustratively a first-in-first-out (FIFO) memory) 320, and a Transmit MAC 325. The Receive portion of the of the network interface controller 225 of FIG. 4 illustratively comprises a Receive MAC 330, a Receive Buffer Manager/DMA 335, a Receive data memory (illustratively a first-in-first-out (FIFO) queue) 340, a Receive IP filter 345, and a Receive Sync Generator 350. The network interface controller 225 of FIG. 4 further comprises a Bus Interface 360 common to both the Transmit Portion and the Receive Portion and a counter 370.

In the network interface controller 225 of FIG. 4, the Transmit Data FIFO 320 and the Receive Data FIFO 340 illustratively comprise a plurality of physical sections (e.g., slots). The sections of the Transmit Data FIFO 320 and the Receive Data FIFO 340 are implemented to store the various synchronous data to be transmitted and received by the network interface controller 225. In embodiments of the present invention, each slot of the Data FIFOs may store a single data packet or alternatively, each slot may store more than one data packet.

Referring back to FIG. 4, a first data packet to be transmitted by the network interface controller 225 to an intended one of the other Ethernet terminals is located and stored by the Transmit Buffer Manager/DMA 315 of the network interface controller 225 in, for example, a first slot, slot 1, of the Transmit Data FIFO 320 to be transmitted according to a timing schedule, which will be described in detail below. Subsequently received synchronous data to be transmitted by the network interface controller 225 will be located and stored by the Transmit Buffer Manager/DMA 315 in, for example, a second slot, slot 2, of the Transmit Data FIFO 320 and so on. Regular IP data (i.e., asynchronous data) to be transmitted by the network interface controller 225 is situated by the Transmit Buffer Manager/DMA 315 in a section of the Transmit Data FIFO 320 allocated for asynchronous data, labeled, in this example, as IP Data FIFO. Similarly, the Receive Data FIFO 340 is divided into different sections for organizing received synchronous data depending on when the data was received and from where the data was received as described above for the Transmit portion of the network interface controller 225. The Transmit Data FIFO 320 and the Receive Data FIFO 340 are segmented as previously described, such that synchronous data to be transmitted or received is not delayed in being loaded into a Data FIFO of a terminal. As such, each of the respective slots of the Data FIFOs must be deep enough to hold at least up to a whole frame of data and even further, the respective Data FIFOs must each be deep enough to ensure the queuing of any number of synchronous data packets that are capable of being transmitted by each of the terminals within a predetermined time period. Although in FIG. 4, the network interface controller 225 is depicted as comprising a Transmit Data FIFO 320 and a Receive DATA FIFO 340 comprising a plurality of physical slots, in alternate embodiments of the present invention, a Transmit Data FIFO 320 and a Receive DATA FIFO of the present invention may be formatted in software and controlled by a Transmit Buffer Manager/DMA and a Receive Buffer Manager/DMA, respectively, to arrange data packets in the FIFOs such that they are distinguishable as described above, yet not necessarily maintained in different physical slots.

Similarly, in the network interface controller 225 of FIG. 4, the Transmit Sync Generator 310 and the Receive Sync Generator 350 also illustratively comprise a plurality of sections (e.g., slots). The sections of the Transmit Sync Generator 310 and the Receive Sync Generator 350 are operative for generating respective triggers for causing the transmission of synchronous data stored in specific sections of the Transmit Data FIFO 320 and for storing received synchronous data in respective sections of the Receive Data FIFO 340. For example, a trigger generated by the first slot, slot 1, of the Transmit Sync Generator 310 causes synchronous data stored in, for example the first slot, slot 1, of the Transmit Data FIFO 320 to be transmitted by the Transmit MAC 325 to an intended terminal. Similarly, a trigger generated by the first slot, slot 1, of the Receive Sync Generator 350 causes synchronous data received during the first transmit time slot to be stored in, for example, the first slot, slot 1, of the Receive Data FIFO 340. The generation of the respective triggers by the Transmit Sync Generator 310 and the Receive Sync Generator 350 are described in detail below.

Although in the network terminal 225 of FIG. 2 the number of slots of the Transmit Sync Generator 310 and the Receive Sync Generator 350 are equal to the number of slots of the Transmit Data FIFO 320 and the Receive Data FIFO 340, in alternate embodiments of the present invention the number of slots do not have to be equal. That is, in alternate embodiments of the present invention, a single trigger from the Transmit Sync Generator 310 may cause synchronous data in more than one slot of the Transmit Data FIFO 320 to be transmitted or alternatively, more than one trigger from the Transmit Sync Generator 310 may be required to cause a synchronous data in a single slot of the Transmit Data FIFO 320 to be transmitted. Similarly, a single trigger from the Receive Sync Generator 350 may cause received synchronous data to be stored in more than one slot of the Receive Data FIFO 340 or alternatively, more than one trigger from the Receive Sync Generator 350 may be required to cause received synchronous data to be stored in a single slot of the Receive Data FIFO 340. Furthermore, although in the embodiment of the present invention disclosed above, synchronous data was depicted as being located in a respective section of the Transmit Data FIFO according to the time the data was received for transmitting by the network interface controller 225, in alternate embodiments of the present invention, synchronous data is stored in respective sections of the Transmit Data FIFO according to which Ethernet terminal the synchronous data is intended. For example, data to be transmitted to the second Ethernet terminal by the network interface controller 225 may be stored in a second section of the Transmit Data FIFO. Likewise, data to be transmitted to the third Ethernet terminal by the network interface controller 225 may be stored in a third section of the Transmit Data FIFO. In such embodiments of the present invention, the Transmit Data FIFO and the Receive Data FIFO must comprise at least one slot for each terminal of the network.

In addition, although in the embodiment of the present invention disclosed above, a generated trigger is operative for causing the transmission of data stored in a respective section of the Transmit Data FIFO of the network interface controller 225, in alternate embodiment of the present invention, a generated trigger may be operative for causing the transmission of data stored in any section of the Transmit Data FIFO. The advantage of such a configuration in accordance with the present invention is realized, at least, in optimizing bandwidth utilization, which is described in detail below. Briefly stated, if an Ethernet terminal, for example the first Ethernet terminal $210_1$ is transmitting data to another Ethernet terminal, for example the fourth Ethernet terminal $210_4$, during a first time slot of a Sync Time Frame, an Ethernet terminal not in communication with the first terminal $210_1$, for example the second terminal $210_2$, may implement a trigger generated by its Transmit Sync Generator during the first time slot to cause the transmission of data stored data in any section of its Transmit Data FIFO, for example slot 3, (which is storing data to be transmitted to the third terminal $210_3$ in this example) to another available Ethernet terminal, for example the third terminal $210_3$.

As illustrated in FIG. 2 above, in the asynchronous/synchronous LAN 200 of FIG. 2, the Sync Generator 230 is in communication with each of the Ethernet terminals $210_1$-$210_4$. The Sync Generator 230 generates a recurring global timing schedule, referred to as a Sync Time Frame, for synchronizing the communication between the Ethernet terminals $210_1$-$210_4$ of the asynchronous/synchronous LAN 200. The Sync Time Frame generated by the Sync Generator 230 is generated at regulated intervals and is a dynamic parameter whose total time duration (e.g., sync time) and interval time may be adjusted according to the latency desired in a specific network or system. The size of the Sync Time Frame may be predetermined by a user or may be dynamically set by the network manager 235 according to the size of synchronous data that needs to be transmitted by each of the Ethernet terminals $210_1$-$210_4$.

The initiation of the Sync Time Frame generated by the Sync Generator 230 causes the counters 370 of each of the network interface controllers $225_1$-$225_4$ of the Ethernet terminals $210_1$-$210_4$ to synchronize to a specific count (i.e., the counter 370 of each of the terminals $210_1$-$210_4$ are reset). The counters 370 of each of the Ethernet terminals $210_1$-$210_4$ then continue to count until a predetermined count number has been reached. A trigger is then generated by the Transmit Sync Generator 310 and the Receive Sync Generator 350 of an Ethernet terminal to cause specific synchronous data in the Transmit Data FIFO 320 to be transmitted from the Ethernet terminal and to cause a received data packet to be stored in an appropriate, respective location of the Receive Data FIFO 340 of the transmitting Ethernet terminal.

Figure 5:
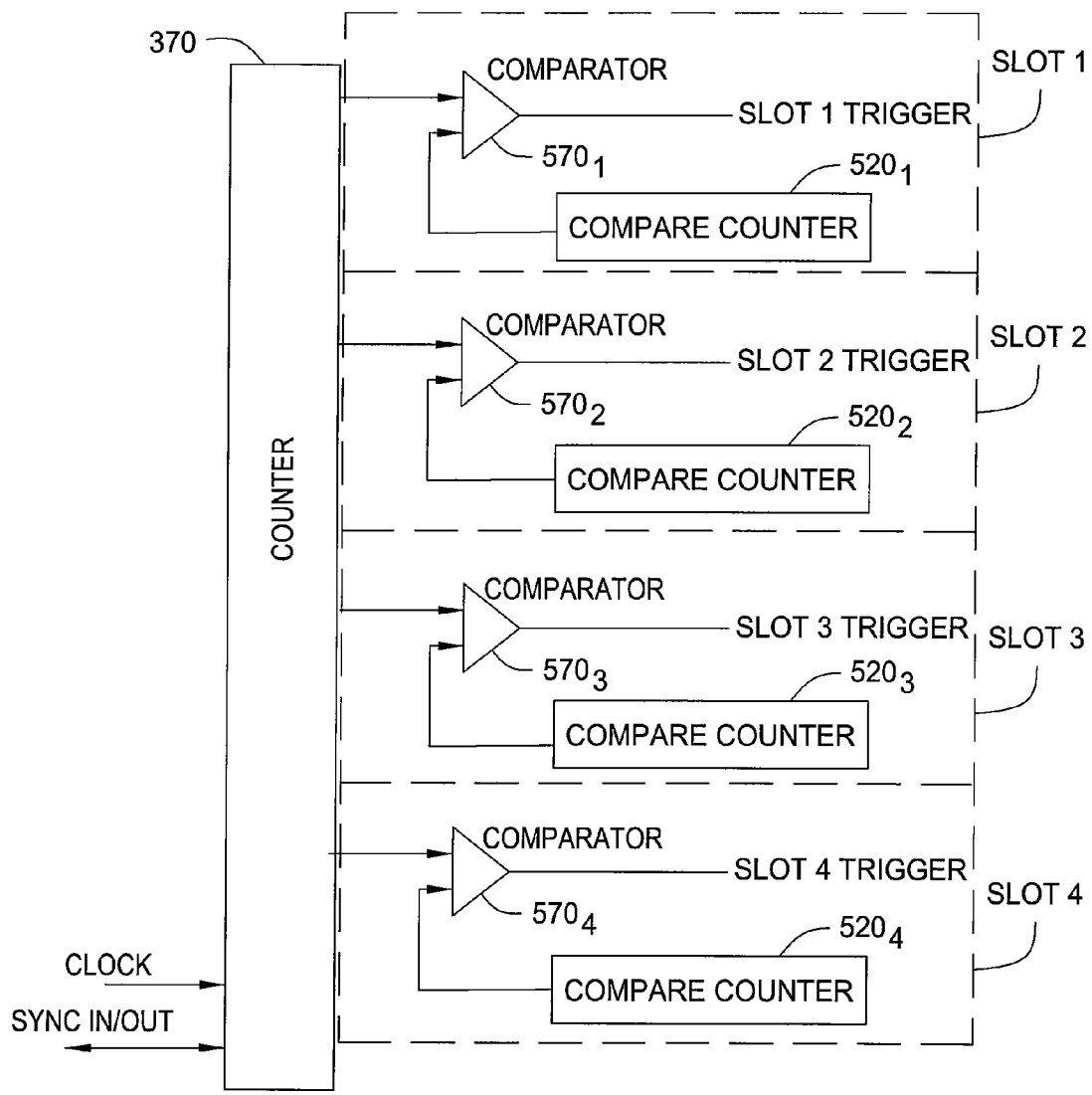
FIG. 5 depicts a high level block diagram of an embodiment of the Transmit Sync Generator of the network interface controller of FIG. 4 and its interaction with the counter.

More specifically, FIG. 5 depicts a high level block diagram of an embodiment of the Transmit Sync Generator 310 (or the Receive Sync Generator 350) of the network interface controllers $225_1$-$225_4$ of the Ethernet terminals $210_1$-$210_4$ and its interaction with the counter 370. Because the Transmit Sync Generators and the Receive Sync Generators of the present invention are substantially similar, the Transmit Sync Generator 310 of FIG. 5 should be considered representative of each of the Transmit Sync Generators and the Receive Sync Generators of the network interface controllers $225_1$-$225_4$ of the Ethernet terminals $210_1$-$210_4$. In FIG. 5, each of the four slots of the Transmit Sync Generator 310, slots 1-4, illustratively comprises a comparator $510_1$-$510_4$ and a compare counter $520_1$-$520_4$. When the value of the counter 370 matches the value of one of the compare counters $520_1$-$520_4$, the Transmit Sync Generator 310 generates a trigger signal to cause synchronous data stored in a respective slot of the Transmit Data FIFO 320 to be transmitted by the Transmit MAC 325. For example, if the compare counter $520_1$ of slot 1 comprises a count of eight (8), when the counter 370 reaches a count of 8, a trigger is generated by the Transmit Sync Generator 310 to cause synchronous data stored in the first slot, slot 1, of the Transmit Data FIFO 320 to be transmitted by the Transmit MAC 325 to an intended terminal. Similarly, if the compare counter $520_2$ of slot 2 comprises a count of sixteen (16), when the counter 370 reaches a count of 16, a trigger is generated by the Transmit Sync Generator 310 to cause synchronous data stored in slot 2 of the Transmit Data FIFO 320 to be transmitted by the Transmit MAC 325 to an intended terminal. The period of time between the trigger generated by the first slot, slot 1, of the Transmit Sync Generator 310 and the trigger generated by the second slot, slot 2, of the Transmit Sync Generator 310 comprises a first time slot in the Sync Time Frame generated by the Sync Generator 230. Likewise, the periods of time between the second and third trigger and the third and fourth trigger, comprise respective second and third time slots Sync Time Frame generated by the Sync Generator 230. Furthermore, the time allotted for the transmission of the synchronous data in the fourth slot, slot 4, (i.e., through the use of a trigger generated by a subsequent predetermined count number) of the Transmit Data FIFO 320, comprises a fourth time slot in the Sync Time Frame generated by the Sync Generator 230. Briefly stated, the size of the slots, slots 1-4, for transmitting synchronous data is determined by the difference in the stored count numbers between successive compare counters $520_1$-$520_4$ of the Transmit Sync Generator 310. The values in the compare counters $520_1$-$520_4$ may be predetermined by a user or may be dynamically set by the network manager 235 according to the size of synchronous data that needs to be transmitted by each of the Ethernet terminals $210_1$-$210_4$. In addition, an additional period of time is allotted in the Sync Time Frame for the transmission of asynchronous data.

As previously disclosed, when a transmit sync trigger is generated by the Transmit Sync Generator 310, a corresponding receive sync trigger is generated by the Receive Sync Generator 350. More specifically, in an embodiment of the present invention, the compare counters of the Transmit Sync Generator 310 and the Receive Sync Generator 350 comprise the same respective count numbers and as such triggers are simultaneously generated by the Transmit Sync Generator 310 and the Receive Sync Generator 350 of respective Ethernet terminals.

However, in alternate embodiments of the present invention, multi-frame triggers may be implemented. More specifically, to account for and accommodate different data rates that may occur in a network in accordance with the present invention, the Transmit Sync Generator and the Receive Sync Generator of a terminal may be adapted to generate a trigger in, for example, every other frame instead of every frame. That is, the Transmit Sync Generator and the Receive Sync Generator of an Ethernet terminal may be adapted to generate a trigger after a certain number of frames have occurred (instead of generating a trigger within each frame) on a slot-by-slot basis or on a terminal-by-terminal basis. For example, each slot of a terminal may be configured to either operate on a multi-frame basis or a single frame basis, or an entire terminal may be configured to operate on a multi-frame basis. As such, different data rates may be accommodated by the terminals of an asynchronous/synchronous LAN in accordance with the present invention.

Furthermore, the generation of respective time slots by each of the Ethernet terminals $210_1$-$210_4$ within a Sync Time Frame may be prioritized. More specifically, in an embodiment of the present invention, a particular Ethernet terminal may be given priority over other Ethernet terminals in the generation of a time slot within a Sync Time Frame within which to transmit and receive its synchronous data. For example, the first terminal $210_1$ may always have priority of transmission. That is, if the first terminal $210_1$ has any synchronous data to transmit during any of the time slots, the first terminal $210_1$ may be given priority to transmit its synchronous data within those time slots. In alternate embodiments of the present invention, priority may be assigned to a terminal that is to receive data. For example, if in a network it is imperative for the first terminal $210_1$ to receive synchronous data as soon as the synchronous data is available, then any terminal that receives synchronous data intended for the first terminal $210_1$ will be given priority of transmission within a time slot of the Sync Time Frame. In other embodiments of the present invention, specific types of synchronous data may be given priority of transmission. As such, when any terminal has such synchronous data to be transmitted, that terminal would be given priority of transmission within a time slot for transmission. It will be appreciated by those skilled in the art informed by the teachings of the present invention, that various forms of prioritization for the transmission and receiving of synchronous data may be implemented within the concepts of the present invention. As such, the specific embodiments of the present invention described herein should not be treated as limiting the scope of the invention. Furthermore, the prioritization of communication between the terminals of an asynchronous/synchronous network in accordance with the present invention may be predetermined by a user or may be dynamically set by, for example, the network manager 235 depending on the latency required by synchronous data awaiting to be transmitted. The priority of communication of the present invention is managed by, for example, the network manager 235 such that the latency for any particular synchronous data packet does not exceed a maximum allowable latency time for the particular synchronous data awaiting transmission.

Figure 6:
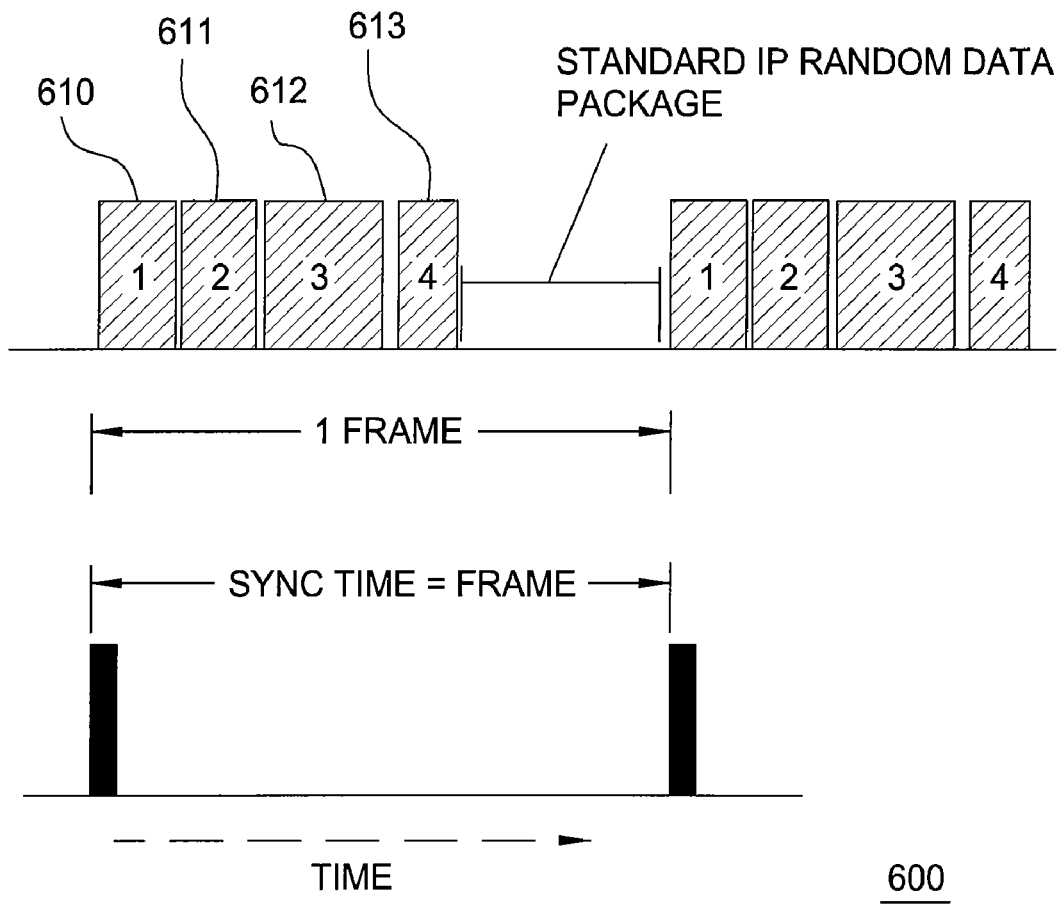
FIG. 6 depicts a high level block diagram of an embodiment of a Sync Time Frame generated by the Sync Generator of the LAN of FIG. 2 for synchronizing the communication between the Ethernet terminals.

FIG. 6 depicts a high level block diagram of an embodiment of a Sync Time Frame generated by the Sync Generator 230 for synchronizing the communication between the Ethernet terminals $210_1$-$210_4$ of the asynchronous/synchronous LAN 200 including four time slots generated by the Transmit Sync Generator 310 of the first Ethernet terminal $210_1$, as described above, for transmission and reception of its synchronous data. The Sync Time Frame 600 of FIG. 6 illustratively comprises four time slots 610-613 and an additional section of time allocated for transmission of standard, asynchronous IP data. During the first time slot 610 of the Sync Time Frame 600 of FIG. 6, the first terminal $210_1$ may wish to transmit synchronous data to the fourth terminal $210_4$. As such, during the first time slot 610 no other terminal may transmit data to the fourth terminal $210_4$. However to optimize the use of available bandwidth, the second terminal $210_2$ and the third terminal $210_3$ may exchange synchronous data during the first time slot 610. That is, during the first time slot 610, both the Transmit Sync Generator of the first terminal $210_1$ and the Transmit Sync Generator of the second terminal $210_2$ may generate respective trigger signals that are communicated to their respective Transmit Buffer Manager/DMAs to cause the synchronous data awaiting transmission to the fourth terminal $210_4$ and the third terminal $210_3$, respectively, to be transmitted by a respective Transmit MAC. To further optimize communication and as disclosed above, data intended for specific non-conflicting terminals stored in any slot of respective Transmit Data FIFOs may be triggered for transmission by a trigger generated in substantially any slot of respective Transmit Sync Generators. That is and for example, during the first time slot 610 of the Sync Time Frame 600, any of the Ethernet terminals may transmit data as long as not more than one of the Ethernet terminals is attempting to transmit data to a common Ethernet terminal (i.e., non-conflicting terminals).

Likewise, during the second time slot 611 of the Sync Time Frame 600, the first terminal $210_1$ may wish to transmit synchronous data to the third terminal $210_3$. As such, during the second time slot 611 no other terminal may transmit data to the third terminal $210_3$. Again though to optimize the available bandwidth, the second terminal $210_2$ and the fourth terminal $210_4$ may exchange synchronous data during the second time slot 611. As depicted in FIG. 6, the Sync Time Frame 600 further comprises an additional period of time allotted for the transmission of standard IP random data. More specifically, during the time period allotted for the transmission of standard IP random data, asynchronous data is processed in the same manner as described for the LAN 100 of FIG. 1. More specifically, the method for the transmission of synchronous data in accordance with the present invention does not undermine or interfere with conventional Ethernet protocol standards for asynchronous packet communication. That is, any asynchronous data packet transmission that was interrupted by the synchronous mode of the present invention is retransmitted until the reception of that data packet by an intended receiver has been confirmed.

Figure 7:
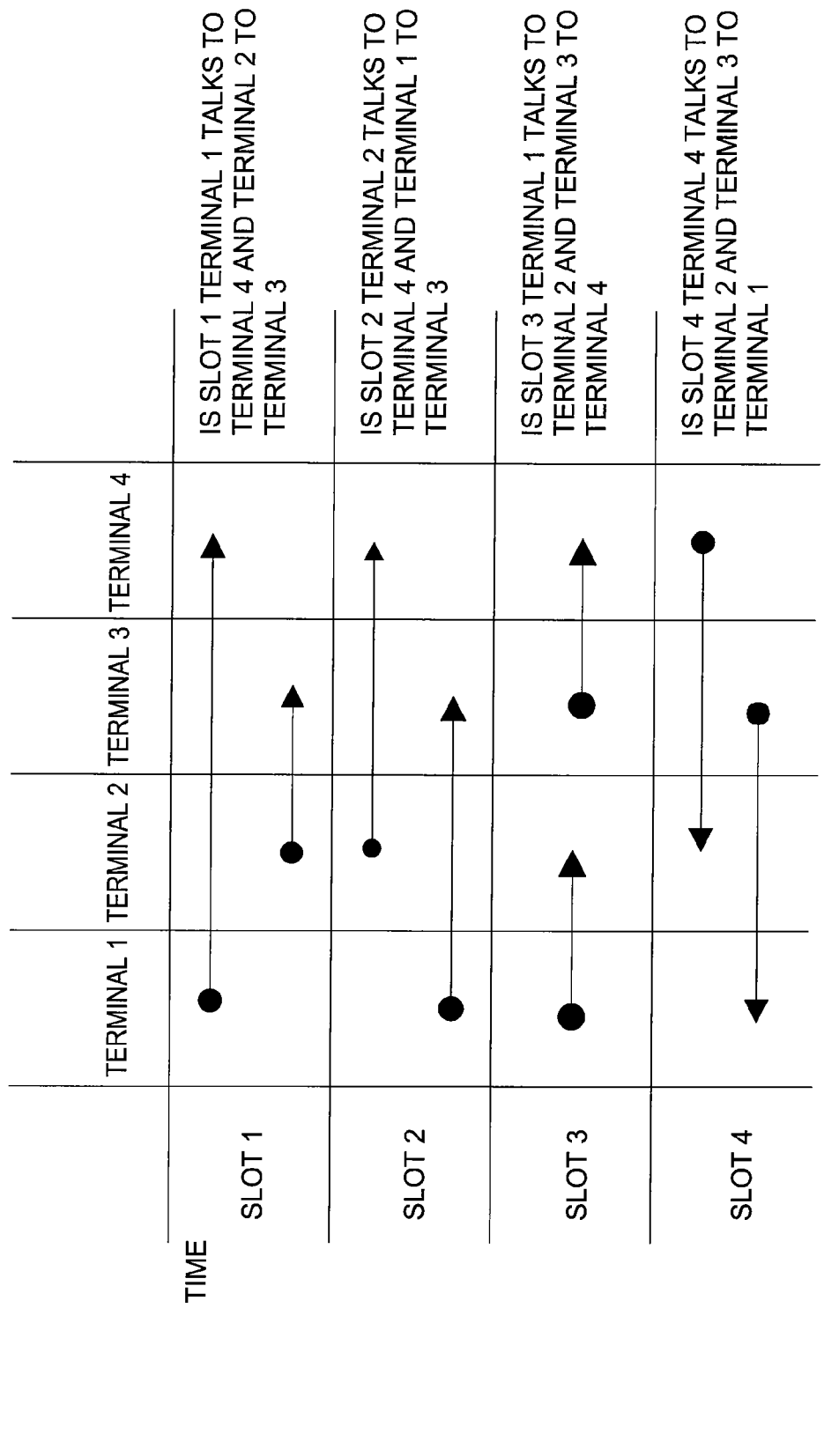
FIG. 7 depicts a time slot configuration diagram of an embodiment of the communication of data between the terminals of the LAN of FIG. 2 within the four time slots of the Sync Time Frame of FIG. 6.

FIG. 7 depicts a time slot configuration diagram for the above described communication within the four time slots 610-613 of the Sync Time Frame 600 of FIG. 6. In FIG. 7 during the first time slot 610, the first terminal $210_1$ transmits synchronous data to the fourth terminal $210_4$ and the second terminal $210_2$ transmits synchronous data to the third terminal $210_3$. With such a configuration, there is no possibility of collision between the synchronous data being transmitted in an asynchronous/synchronous network in accordance with the present invention. Furthermore, in FIG. 7 during the second time slot 611, the first terminal $210_1$ transmits synchronous data to the third terminal $210_3$ and the second terminal $210_2$ transmits synchronous data to the fourth terminal $210_4$. During the third time slot 612 of FIG. 7, the first terminal $210_1$ transmits synchronous data to the second terminal $210_2$ and the third terminal $210_3$ transmits synchronous data to the fourth terminal $210_4$. During the fourth time slot 613 of FIG. 7, the fourth terminal $210_4$ transmits synchronous data to the second terminal $210_2$ and the third terminal $210_3$ transmits synchronous data to the first terminal $210_1$.

It should further be noted that during a specific time slot of a Sync Time Frame of the present invention, a transmitting terminal may also receive data packets. More specifically and for example, during the first time slot 610 of the Sync Time Frame 600 generated by the Sync Generator 230, the first terminal 210₁ is also adapted to receive data from one of the other terminals 210₂-210₄. In a symmetrical configuration, the asynchronous/synchronous LAN 200 is configured such that a transmitting terminal may only receive data from the terminal for which the transmission of the transmitting terminal is intended. Specifically if during the first time slot 610 the first terminal 210₁ transmits synchronous data to the fourth terminal 210₄, the first terminal 210₁ may only receive data from the fourth terminal 210₄ during that time slot 610 of the Sync Time Frame 600 of FIG. 6. In alternate embodiments of the present invention (i.e., for non-symmetrical applications), the LAN 200 may be configured such that during the first time slot 510, the first terminal 210₁ may receive data from any of the other terminals 210₂-210₄ provided that only one of the other terminals transmits data to the first terminal 210₁ during the first the time slot 610 of the Sync Time Frame 600. Because the Sync Time Frame generated by the Sync Generator 230 is a global parameter, all of the four terminals 210₁-210₄ of the LAN 200 are aware of which of the terminals are to transmit at what time and to which terminal they are allowed to transmit (i.e., the network manager 235 is aware of the network communication parameters). After transmission of the synchronous data by the four terminals 210₁-210₄ of the LAN 200, any asynchronous data packet transmission that was interrupted by the transmission of the synchronous data during the allocated time slots is retransmitted during the period allocated for standard IP data transmission. More specifically, during the time period allocated for standard IP data transmission, standard IP data buffered in a section of the Transmit Data FIFO 320 allocated for asynchronous data is transmitted according to conventional Ethernet protocol standards for asynchronous packet communication. Likewise, when asynchronous data is received by a terminal, the Receive IP filter 345 recognizes the data as regular IP asynchronous data and causes the Receive Buffer Manager/DMA 335 to direct the received data into the section of the Receive Data FIFO 340 allocated for the storage of regular IP asynchronous data.

The concepts of the present invention disclosed herein may be implemented, for example, in CDMA/UMTS base stations of wireless networks for the transfer of uplink/downlink data from channel elements to a radio receiver.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for guaranteeing delivery times of data communicated between communications devices of an asynchronous network comprising:
   generating a global timing schedule for synchronizing the communication between the communications devices, wherein:
   the global timing schedule comprises at least one time frame including a plurality of time slots;
   in each of at least one of the time slots, the global timing schedule being configured to associate a plurality of transmitting communications devices with a respective plurality of receiving communications devices such that each of the communications devices is associated with only one other of the communications devices in the time slot.

2. The method of claim 1, wherein each of the communications devices generates a respective trigger for enabling the transmitting or receiving of data by the communications device according to the global timing schedule.

3. The method of claim 1, further comprising:
   transmitting and receiving data by the communications devices according to the global timing schedule.

4. The method of claim 3, wherein synchronous data is communicated within each of the plurality of time slots.

5. The method of claim 3, wherein the transmitting and receiving data according to the global timing schedule is prioritized such that delivery time of synchronous data does not exceed a maximum latency allowed for the synchronous data.

6. The method of claim 3, wherein each of the at least one time frame further comprises a period of time for communicating asynchronous data.

7. The method of claim 6, wherein the communicating of asynchronous data is performed without undermining conventional Ethernet protocol standards.

8. The method of claim 3, wherein the transmitting and receiving data during each of the plurality of time slots is performed according to pre-defined priorities of communication.

9. The method of claim 8, wherein a selected one of the communications devices is given priority for communicating during each of the plurality of time slots.

10. The method of claim 8, wherein each of the communications devices is given priority for communicating during a respective one of the plurality of time slots.

11. An apparatus for guaranteeing delivery times of data communicated between communications devices of an asynchronous network, comprising:
    a timing signal generator, for generating a global timing schedule for synchronizing communication between the communications devices, wherein:
    the global timing schedule comprises at least one time frame including a plurality of time slots;
    in each of at least one of the time slots, the global timing schedule being configured to associate a plurality of transmitting communications devices with a respective plurality of receiving communications devices such that each of the communications devices is associated with only one other of the communications devices in the time slot.

12. The apparatus of claim 11, wherein each of the plurality of slots is adapted for transmitting and receiving synchronous data by the communications devices.

13. The apparatus of claim 12, wherein the global timing schedule is adapted to prioritize transmitting and receiving data such that delivery time of the synchronous data does not exceed a maximum latency allowed for the synchronous data.

14. The apparatus of claim 12, wherein each of the at least one time frame further comprises a period of time for communicating asynchronous data.

15. The apparatus of claim 14, wherein the global timing schedule is configured to provide for transmitting and receiving of asynchronous data without undermining conventional Ethernet protocol standards.

16. In an asynchronous network including a plurality of communications devices, a system for guaranteeing delivery times of data communicated between the communications devices, the system comprising:
    a timing signal generator, for generating a global timing schedule for synchronizing communication between the communications devices, wherein:
    the global timing schedule comprises at least one time frame including a plurality of time slots;

in each of at least one of the time slots, the global timing schedule being configured to associate a plurality of transmitting communications devices with a respective plurality of receiving communications devices such that each of the communications devices is associated with only one other of the communications devices in the time slot.

17. The system of claim 16, wherein the global timing schedule is configured to define priorities of communication for transmitting and receiving data during each of the plurality of time slots.

18. The system of claim 17, wherein the global timing schedule is configured to provide priority for communicating, during each of the plurality of time slots, to a selected communications device.

19. The system of claim 17, wherein the global timing schedule is configured to provide priority for communicating to each of the communications devices during a respective time slot of the plurality of time slots.

20. The system of claim 16, wherein each of the communications devices generates a respective trigger for enabling of transmitting or receiving data by the communications device according to the global timing schedule.

* * * * *